United States Patent
Kawai

[15] 3,680,922
[45] Aug. 1, 1972

[54] HYDRAULIC BRAKING PRESSURE CONTROL SYSTEM HAVING VALVE RESPONSIBLE TO THE OIL PRESSURE DEVIATION FOR VEHICLES

[72] Inventor: Shinji Kawai, Kariya-shi, Japan
[73] Assignee: Kelsey-Hayes Company, Romulus, Mich.
[22] Filed: Jan. 26, 1970
[21] Appl. No.: 5,785

[30] Foreign Application Priority Data
Jan. 28, 1969 Japan..............................44/5710

[52] U.S. Cl..................303/6 C, 137/493.4, 137/508, 188/349
[51] Int. Cl. ............................B60t 8/26, B60t 11/34
[58] Field of Search..............137/505.25, 508, 493.4; 60/545 E; 303/6, 6 C, 22, 22 A; 188/152.11, 349

[56] References Cited
UNITED STATES PATENTS

| | | | |
|---|---|---|---|
| 3,304,128 | 2/1967 | Farr | 303/6 C |
| 3,377,108 | 4/1968 | Eddy | 303/6 C X |
| 3,472,559 | 10/1969 | Bueler | 303/6 C |
| 3,532,390 | 10/1970 | Bueler | 303/6 C |

Primary Examiner—Milton Buchler
Assistant Examiner—John J. McLaughlin
Attorney—Harness, Dickey & Pierce

[57] ABSTRACT

The brake control device functions initially in the ordinary manner to first apply the same pressure to the brake cylinders of the front and rear wheels and thereafter to provide a slower rise in pressure to the rear wheel brake cylinders as the pressure on the front brake cylinders increases. Thereafter, there will be no further increase in pressure applied to the rear wheel brake cylinders as further pressure is applied to the front wheel brake cylinders and the brake control device.

5 Claims, 5 Drawing Figures

Fig. 3
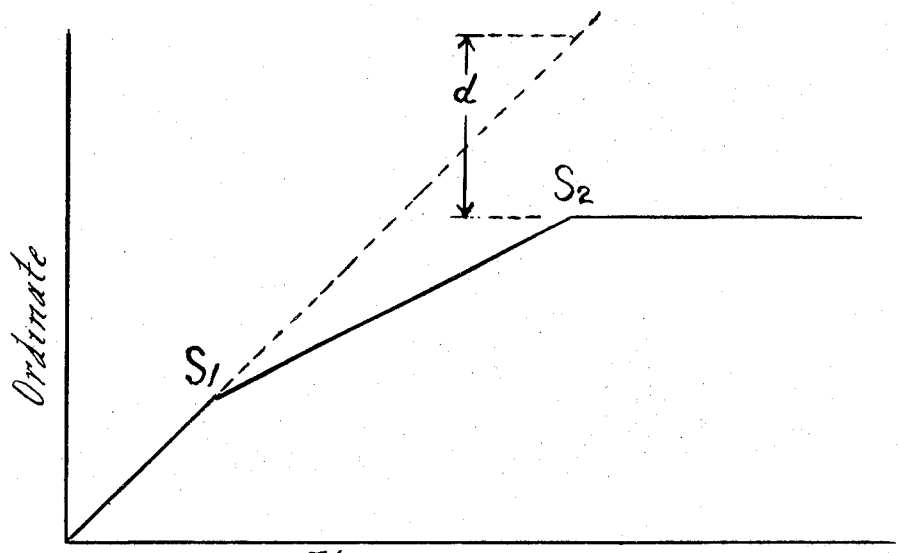
Fig. 4
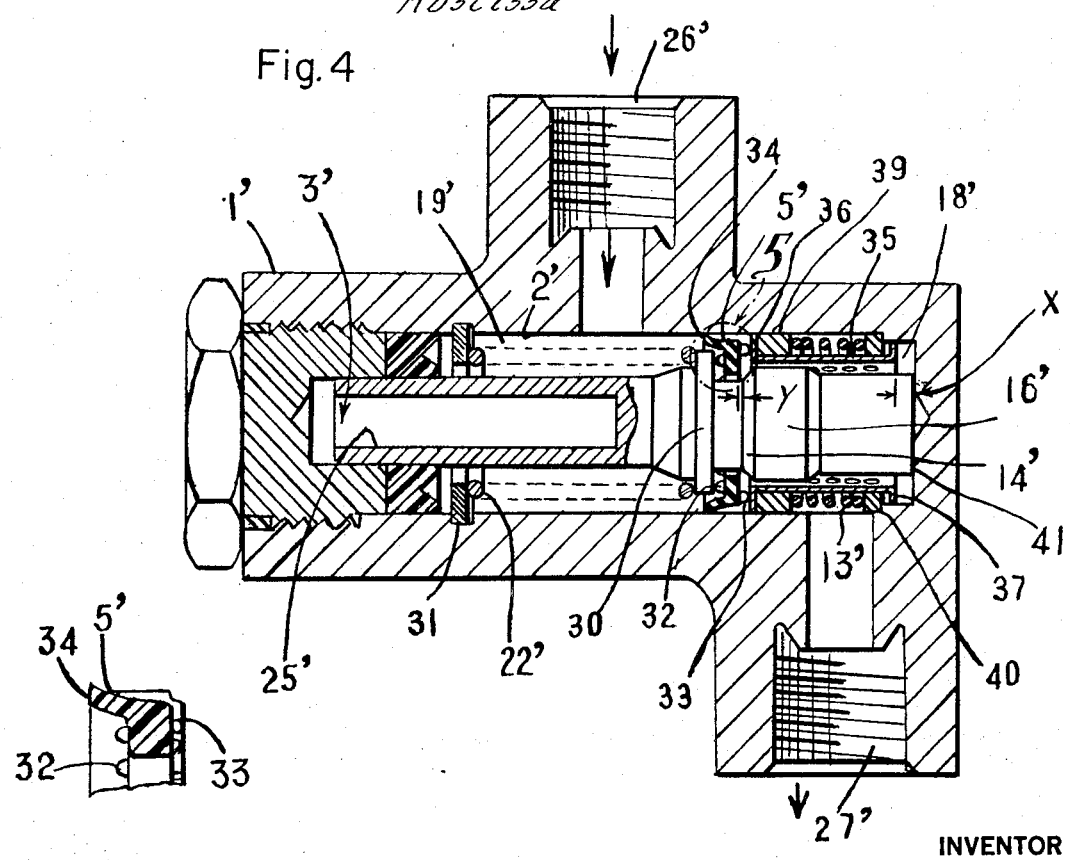
Fig. 5

HYDRAULIC BRAKING PRESSURE CONTROL SYSTEM HAVING VALVE RESPONSIBLE TO THE OIL PRESSURE DEVIATION FOR VEHICLES

SUMMARY OF THE INVENTION

The present invention relates to a device for regulating the distribution of braking fluid under pressure to be fed to the cylinders of the front and rear wheels of a vehicle. A performance curve is expressed in a graph in which the axis of abscissa denotes the hydraulic pressure imposed on the front brakes while the axis of ordinate denotes the hydraulic pressure imposed on the rear brakes. The graph shows three straight lines with two points of change with the third line beyond the second change point parallel to the ordinate providing no increase in pressure to the rear brakes as greater pressure is applied to the front brakes.

According to the present invention, the valve mechanism of a control valve is provided with a spring whereby, when the deviation of hydraulic pressure in the master cylinder and hydraulic pressure at the rear brake cylinders reaches a predetermined value sufficient enough to bear against the load imposed by the spring and then to compress said spring, the piston in the control valve strikes against the body of the control valve, while said valve is being closed, to cut off the communication between the master cylinder and the rear brake cylinders. The device of the present invention is so designed that, even if the applied force is further strongly imposed on the brake pedal after the piston strikes against the body of the control valve as mentioned above, the hydraulic pressure from the master cylinder does not flow to the rear wheel cylinders. Therefore, the performance curve of the control valve after the body is engaged by the piston shows parallelism to the axis of abscissa, and in whole the performance curve of three straight lines with two points of change, closely resembles an ideal performance curve.

BRIEF DESCRIPTION OF THE DRAWING

FIG. 3 is a view of a graph showing the performance curve produced by the structure illustrated in FIG. 1;

FIG. 4 is a view of structure illustrating another embodiment of the present invention, and FIG. 5 is an enlarged broken view of the structure illustrated in FIG. 4, as viewed within the circle 5 thereof.

DESCRIPTION OF THE PREFERRED EMBODIMENT

Figure 1:
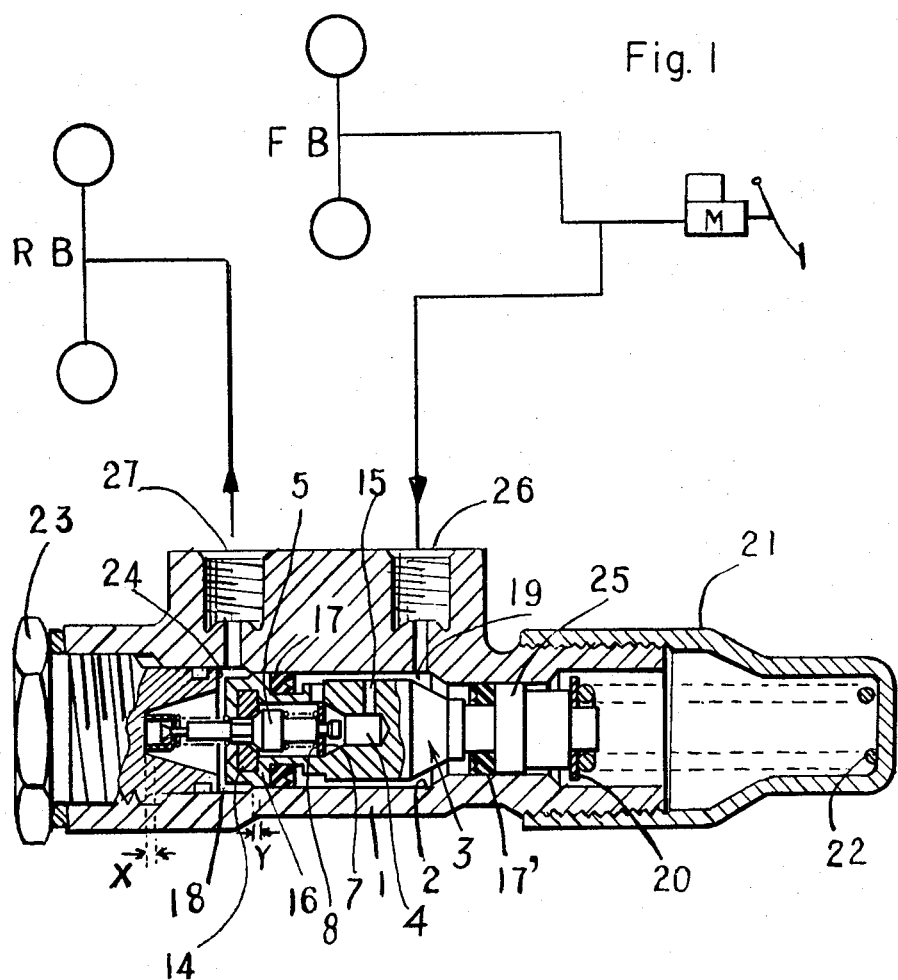
FIG. 1 is a longitudinal sectional view of a control valve incorporated in the control system of the present invention.
Figure 2:
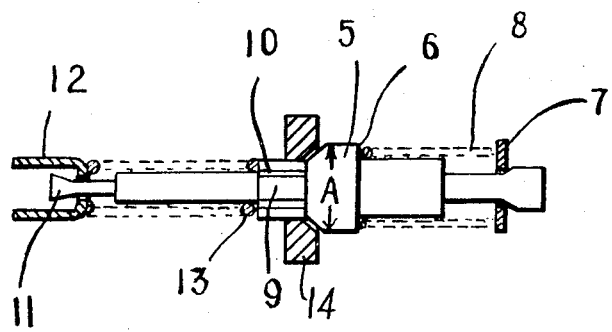
FIG. 2 is an enlarged view of a portion of the structure illustrated in FIG. 1.

Referring to FIG. 1, the body 1 has a hollow portion 2 in which a piston 3 is slidably mounted. The piston 3 has a recessed chamber 4 in which a valve 5 is slidably mounted. The valve 5 has a compression spring 8 extending between the right-hand shoulder 6 and a spring bearing 7 loosely mounted adjacent to an end projected from said shoulder 6 in the right-hand direction, as shown in FIG. 2 on an enlarged scale. The extremity of the right-hand projected end is an enlarged portion.

Although FIG. 2 illustrates the enlarged portion sustaining the spring bearing 7, it is only for convenience sake. When the valve 5 is mounted in the body 1, as shown in FIG. 2, the spring bearing 7 is sustained by a shoulder portion of the recessed chamber 4 to which said spring bearing 7 abuts.

Referring to FIG. 2, the valve 5 is provided on the peripheral surface of a cylindrical portion 9 extended in the left-hand direction with a plurality of grooves 10 along the axial direction. The extremity of the cylindrical portion 9, of which the diameter is smaller than that of the portion 9, has an enlarged end 11 effective to loosely sustain a U-shaped spring bearing 12. Between a shoulder portion of said cylindrical portion 9 and the spring bearing 12 is interposed a compression spring 13.

At the left-hand of the recessed chamber 4 of the piston, as illustrated in FIG. 1, a seat 14 is provided for the valve 5 in which the cylindrical portion 9 of the valve 5 is slidably inserted. The piston 3 is provided with a communication hole 15 for communicating the recessed chamber 4 to the outside of the piston. In the state as shown in the present drawing, the recessed chamber 4 is communicated with the outside of the piston through a gap between the valve 5 and the seat 14 and the grooves 10 provided on the peripheral surface of the cylindrical portion 9.

Furthermore, the piston 3 contacts at a portion 16 of larger diameter with the peripheral surface of the hollow portion 2 of the body 1 and thereby to separate the hollow portion 2 into a left-hand chamber 18 and a right-hand chamber 19 by means of a seal 17 provided adjacent to the right hand of the hollow portion. At the right hand of the piston 3, a portion 25 of smaller diameter contacts the inner peripheral surface of the hollow portion 2. A second seal 17' prevents fluid from leaking beyond the right end of the piston. A compression spring 22 is interposed between a spring bearing 20 and the bottom of a cover 21. In this construction, during the non-operative state, the spring 22 presses the piston in the left-hand direction as shown in FIG. 1 with the result that the left end of the larger diameter portion 16 butts against the shoulder 24 on the inner surface of a plug 23.

Since the spring 13 (shown in FIG. 2) is stronger than the spring 8 in view of the compression force, the spring 13, during the non-operative state of the control valve is fully expanded in the interval defined by the shoulder of the cylindrical portion 9 and the spring bearing 12. When incorporated in the hollow portion 2 as shown in FIG. 1, the spring 13 compresses the spring 8 against the compression force generated by the spring 8 to cause the valve 5 to separate from the seat 14.

The body 1 is also provided with the inlet 26 and outlet 27, respectively, communicating the right-hand chamber 19 to the master cylinder M and the left-hand chamber 18 to the wheel cylinders for the rear wheel brakes RB. Gaps X and Y, as shown in FIG. 1, are designed so that the relationship such as X Y may be established when the piston 3 abuts against the plug 23 to open the valve 5.

When the braking effort is realized while the valve 5 is separated from the seat 14 as shown in FIG. 1, fluid under pressure is fed from the master cylinder first to the right-hand chamber 19 and then to the recessed chamber 4 of the piston through the communication hole 15, and finally through the gap between the valve 5 and the seat 14 and the left-hand chamber 18 to the rear wheel cylinders, with the result that the same pressure as in the master cylinder is applied to the rear wheel cylinders. Accordingly, in this state, not only the rear wheels but also the front wheels are subjected to the same pressure. The line extending from the point zero to the first point of change $S_1$, as shown in FIG. 3, corresponds to the state as hereinbefore described. During this state, the piston 3 is likely to move in the right-hand direction against the spring 22 because an area corresponding to the small diameter portion 25 is effected by hydraulic pressure in the right-hand direction.

However, since the spring 13 is stronger than the spring 8 in view of the compression force during this state, the spring 8 is compressed while the spring 13 is fully expanded in the interval defined by the shoulder of the cylindrical portion 9 and the U-shaped spring bearing 12 as shown in FIG. 1. Accordingly, the U-shaped spring bearing 12 abuts against the bottom of the recess in the plug 23 to maintain the valve 5 at a fixed position, while the spring 22 causes the left end of the larger diameter portion 16 of the piston to contact the shoulder 24 of the plug 23. The gap between the enlargement 11 (shown in FIG. 2) and the cylindrical portion 9 and the relationship between the springs 13 and 8 in view of the compression force must be defined in order to maintain the conditions of the control valve as hereinbefore described during the non-operative state thereof.

With this design of the control valve during the non-operative state, even if the piston commences to move in the right-hand direction incident to the increase of hydraulic pressure fed from the master cylinder, the position of the valve 5 remains unchanged since the spring 8 expands to retain the U-shaped spring bearing 12 in contact with the bottom plane of the recess in the plug 23 and thereby to constantly maintain the interval between the spring bearing 12 to the shoulder of the cylindrical portion 9 at the maximum value.

When the piston 3 is further moved in the right-hand direction, the valve 5 will be engaged by the seat 14 and the outlet 27 is closed from the inlet 26. At this time, control is effected against the further uniform distribution of fluid under pressure to the front and rear brake cylinders. In the performance curve shown in FIG. 3, this time occurs at the point $S_1$. After the valve 5 is engaged by the seat 14 and the outlet is closed from the inlet, hydraulic pressure from the master cylinder acting against an annular area corresponding to the area difference between the larger diameter portion 16 and the smaller diameter portion 25 is balanced with hydraulic pressure at the rear brake cylinders acting against the whole area of the larger diameter portion and, while maintaining this situation, the piston 3 moves in the left-hand direction and subsequently the seat 14 leaves the valve 5. Incident to the occurrence of this movement, fluid in the right-hand chamber instantly flows to the left-hand chamber to increase the fluid under pressure in the left-hand chamber and thereafter the piston moves in the right-hand direction to seat the valve 5. In such a manner as hereinbefore described the operation is repeated. While the braking effort is increasing the hydraulic pressure at the rear brake cylinders increases as the piston 3 repeatedly operates as described above. However, a rate of increase of the hydraulic pressure at this time relative to a rate of increase of the hydraulic pressure from the master cylinder is a rate of the annular area to the whole area of the larger diameter portion. This is shown with the line between $S_1$ and $S_2$ in the performance curve of FIG. 3, and thus the rate of increase of the hydraulic pressure on the rear brake cylinders is smaller than that on the front brake cylinders. This performance follows that of known Pressure Control Valves heretofore available.

Assuming that the diameter of the sealing portion of the valve 5, when the valve 5 engages the seat 14, is denoted by A (as shown in FIG. 2), the difference between the pressure from the master cylinder, that is to say, in the right-hand chamber and pressure in the left-hand chamber, both acting toward the portion denoted by A (Note that the pressure in the left-hand chamber is of smaller value than that of the other.) gradually increases incident to the increase of the braking effort subjected to the brake pedal whereby, when the difference between the predetermined compression forces of the spring 13 and 8 becomes balanced with said pressure difference or becomes smaller than the latter, the spring 13 can no longer stand against the spring 8 and as it is compressed the valve 5 commences to move in the left-hand direction while the piston at the same time moves in the right-hand direction so that the seat 14 engages the valve 5. This results in the movement of the piston 3, the seat 14 and valve 5 as a unit to the left to contact the left-hand extremity thereof against the plug 23 to shut off the flow of fluid to the rear brakes.

In the case where the pressing force is sufficient enough to urge the valve 5 in the left-hand direction due to the pressure difference between the chambers 18 and 19 acting against the annular area of the portion A of the valve 5 is originally greater than the difference of the compression forces between the springs 13 and 8 (although the energying directions of said springs are opposed to each other) and such situation continues, the valve 5 moves in the left-hand direction integrally with the piston while said valve 5 remains on the seat 14 closing the communication between both chambers. Even if the braking effort is further increased after the contact of the left-hand extremity of the piston 3 against the plug 23, no hydraulic pressure from the master cylinder will be fed to the rear wheel brake cylinders. Accordingly, in view of the graph as shown in FIG. 3, the horizontal straight line originating from the point $S_2$ is at this time established. The symbol, $d$, as shown in FIG. 3, denotes the pressure difference occurring at the above moment, and if this pressure difference is greater than the difference of loads respectively imposed on the spring 13 and 8, the braking effort is realized in the manner as hereinbefore described.

To illustrate another embodiment of the present invention with reference to FIGS. 4 and 5, reference numeral 1' is a body having a hollow portion 2' in which a piston 3' having a portion 25' of smaller diameter and a portion 16' of larger diameter is inserted. A compression spring 22' effective to press the piston 3' in the right-hand direction as shown in FIG. 4 is interposed between a flange 30 provided around the piston 3' and a snap ring 31 which is engaged in a groove provided on the inner peripheral surface of the hollow portion of the body 1'. The outer peripheral surface of the portion of larger diameter 16' of the piston 3' serves as valve 14' of which the sealing function is performed in cooperation with an annular seat 5' fitted with a seal of elastic material. The seat 5' is formed in its cross section as shown in FIG. 5 on an enlarged scale, having a plurality of projections 32 spaced on the left-hand annular surface thereof. Since the projections 32 are provided thereon, even if the right-hand surface of the flange 30 of the piston 3' is in contact with said left-hand annular surface of the seat, communication between the right and the left relative to the flange 30 can be maintained through gaps between said projections 32.

Radially arranged on the right-hand surface of the seat 5' are grooves 33 through which fluid under pressure in the right-hand chamber 18' flows into the left-hand chamber 19' when the pressure in the right-hand chamber 18' becomes greater than that in the left-hand chamber 19' as will be hereinafter fully described, that is to say, when the braking effort subjected to the brake pedal is released. In this time, the fluid under pressure to be fed to the left-hand chamber from the right-hand chamber through the grooves 33 may flow between the outer peripheral surface of a lip portion 34 and the inner peripheral surface of the hollow portion 2'. The lip portion 34 is designed such that it may prevent the fluid under pressure from flowing in the right-hand direction while the flow of the fluid in the left-hand direction is facilitated. A perforated cylindrical retainer 35 for the seal has at its both ends flanged portions 36 and 37 to which two members 39 and 40 are respectively pressed in the opposed directions by means of a compression spring 13' interposed between said flanged portions 36 and 37 as shown in FIG. 4. The member 40 is of square cross-section and is at the same time pressed against an annular shoulder formed on the inner peripheral surface of the body 1' from the left-hand direction as shown in FIG. 4. The contact of the member 40 to the annular shoulder is effected by the strong force generated from the spring 22' said force being transmitted through the seat 5', then through the flanged portion 36 of the cylindrical retainer 35, the member 39 and spring 13' in the right-hand direction of the drawing.

In the instant arrangement as shown in FIG. 4, since the right-hand extremity 41 of the piston is in contact with the bottom surface of the body chamber 18', the spring 13' can be no further compressed. Furthermore, since the valve 14' and the seat 5' are in the separated relationship and an inlet 26' and outlet 27' are respectively open, hydraulic pressure from the master cylinder is fed directly to rear wheel cylinders. However, upon continuation of the braking effort subjected to the brake pedal, the hydraulic pressure commences to act against the cross-sectional area of the smaller diameter portion 25' at the left-hand extremity of the piston 3', resulting in the movement of the piston 3' in whole in the left-hand direction of the drawing. Thus, immediately after the valve 14' seats on the seat 5' and subsequently the inlet 26' and outlet 27' are disengaged of their communication, the piston 3' is somewhat moved in the right-hand direction while maintaining a temporary balance between a first hydraulic pressure and a secondary hydraulic pressure. The first hydraulic pressure acts in the right-hand direction from the left-hand chamber 19' against an annular area corresponding to the difference between the cross-sectional area of the smaller diameter portion 25' and an average area of a sealing portion defined by the valve 14' and the seat 5'. The secondary hydraulic pressure acts against the whole area of which the diameter conforms with the sealing portion in the right-hand chamber 18'. Since in accordance with the movement of the piston 3' in the right-hand direction as above mentioned only the valve 14' moves in the right-hand direction while the seat 5' remains stationary, the communication between the right-hand chamber 18' and the left-hand chamber 19' is instantly established and fluid under high pressure in the left-hand chamber 19' flows into the right-hand chamber 18' to cause the pressure in the chamber 18' to somewhat increase.

The operative mode hereinbefore described is the same as in the first mentioned embodiment of the present invention, and, therefore, can be clearly understood without further detailed description. Namely, the operation of the control valve of the present invention as set forth in connection with the second embodiment is the same as in the first mentioned embodiment in view up to the establishment of the second point of change, as shown in FIG. 3.

However, after the establishment of the second point of change, the force of the spring 22' plus the pressure difference between first pressure and secondary pressure stands against the predetermined load imposed on the spring 13'. The first pressure acts in the right-hand direction in the left-hand chamber 19' against the annular area corresponding to the difference between the area of which the diameter is the outer diameter of the seat 5' (the area of which the diameter is the inner diameter of the body) and the area of which diameter is the diameter of the sealing portion of the valve 14'. The secondary pressure acts in the left-hand direction in the right-hand chamber 18' which is smaller than that in the left-hand chamber. Due to this occurrence, as can be seen in connection with the first mentioned embodiment of the present invention, the spring 13' is compressed by the seat 5' to move in the right-hand direction to seat at the valve 14' while the right-hand extremity 41 of the piston 3' is contacted against the bottom plane of the body, resulting in the closing of the valve. Thus, the straight line originating from the point $S_2$ as shown in FIG. 3, is established parallel along the axis of abscissa and no fluid under pressure is fed from the master cylinder to the rear wheel brake cylinders upon further increase in pressure in chamber 19'.

In order to perform the operative mode as hereinbefore described without any obstruction, it must be understood that the interval X between the bottom plane of the body and the right-hand plane of the flanged portion 37 of the cylindrical retainer 35 is greater than the interval Y between the seat 5' and the valve 14' in the non-operative position. By this design, the flanged portion 37 is prevented from contacting against the bottom plane of the body earlier than the right-hand extremity 41 of the piston 3'.

While the valve in the first mentioned embodiment of the present invention set forth with reference to FIGS. 1 and 2 is positioned within the piston, the valve in the second mentioned embodiment set forth with reference to FIGS. 4 and 5 is positioned on the outer periphery of the piston.

The performance curve obtained from either of the control valves set forth in the first mentioned and second mentioned embodiment of the present invention when the braking effort subjected to the brake pedal is released is substantially consistent with that when the braking effort is actuated, with little hysteresis as it is called.

The present invention as hereinbefore fully described is designed such that the same function as can be seen in the conventional Pressure Control Valve may be obtained in view up to the point $S_2$ and that after the point $S_2$ the pressure difference between the wheel cylinders and the master cylinder is detected whereby the control valve of the present invention acts as a cut-off valve to regulate the pressure distribution in order to establish the performance curve as shown in FIG. 3, closely approximate to an ideal performance curve. This purpose is accomplished only by providing a single spring sufficient enough to improve the conventional devices, and therefore, the simplification of the structure, accuracy of the operation and durability of the control valve can be fully appreciated according to the present invention.

Although the present invention has been described in conjunction with a hydraulic braking pressure control valve of the conventional type, it should be noted that the control device of the present invention is applicable to a Load Sensing Valve and other hydraulic pressure control systems having valve mechanisms.

I claim:

1. In a hydraulic braking pressure control system for a vehicle, a body having an inlet and an outlet to a hollow interior, a reciprocal piston in said hollow interior having a valve seat therewithin, sealing means of different diameters on opposite ends of the piston straddling said inlet opening, a reciprocal valve means within the piston movable into and out of engagement with said valve seat, spring means of different strength engaging opposite ends of said valve means for exerting different forces thereon, and a spring at one end of the piston for urging the piston toward the outlet end of the hollow interior into engagement with the end of the body to separate the seat from the valve means under related pressure conditions at the inlet and outlet openings to increase the pressure at the outlet opening at a slower rate than the pressure is increased at the inlet opening.

2. In a hydraulic braking pressure control system as recited in claim 1, wherein the pressure at the inlet opening is applied to the front wheel brake cylinders and the pressure at the outlet opening is applied to the rear wheel brake cylinders.

3. In a hydraulic braking pressure control system as recited in claim 2, wherein the further increase of pressure at the inlet opening produces a movement of the piston and valve means and the separation of the latter from the piston valve seat to increase the flow of fluid and pressure at the outlet opening which thereupon produces the seating of the valve on the valve seat.

4. In a hydraulic braking pressure control system as recited in claim 3, wherein the pressure delivered to the rear wheel brake cylinders progressively decreases as the pressure on the front wheel brake cylinders is increased to a predetermined pressure.

5. In a hydraulic braking pressure control system as recited in claim 4, wherein the relationship of the strength of the springs acting on opposite ends of the valve means in the presence of further increase of pressure beyond said predetermined pressure at the inlet opening will produce the seating of the valve means on the valve seat for the remainder of the time that the pressure at the inlet opening increases without increasing the pressure on the rear wheel brake cylinders.

* * * * *